Patented Mar. 25, 1930

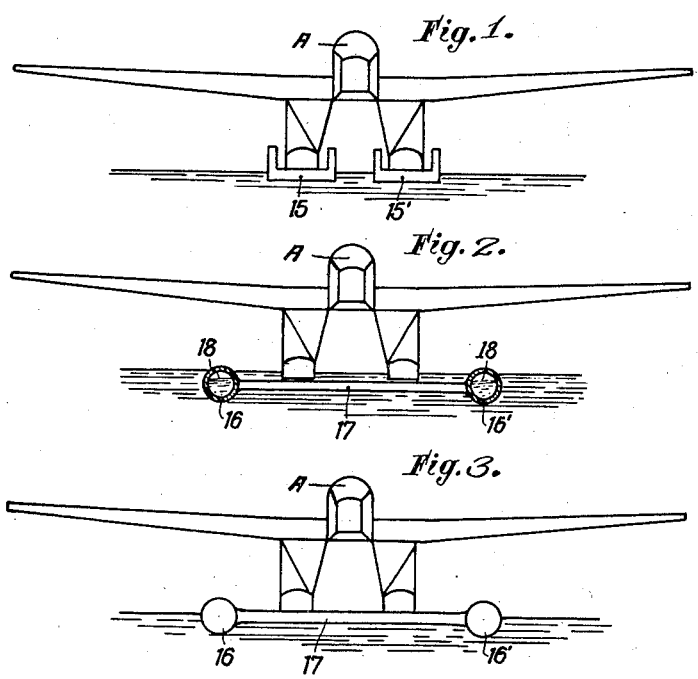

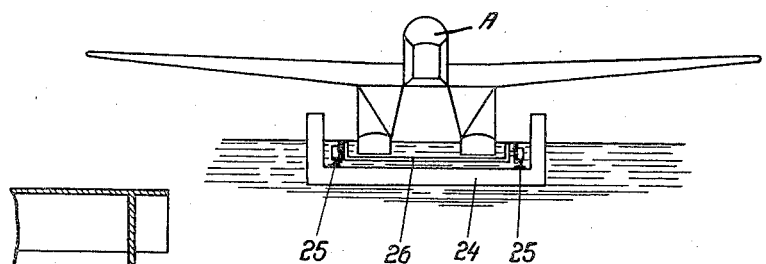
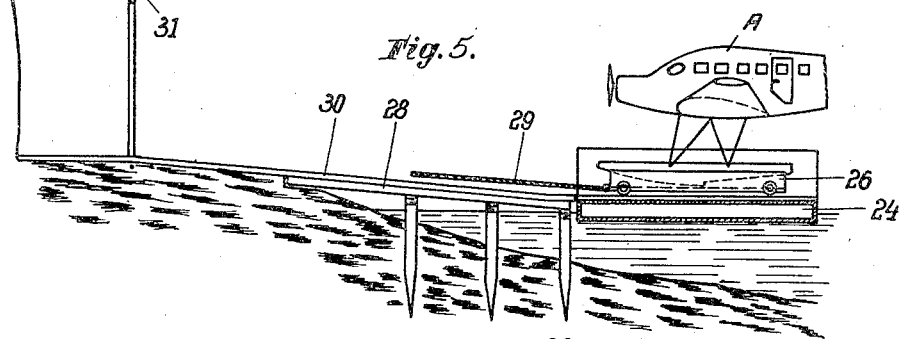
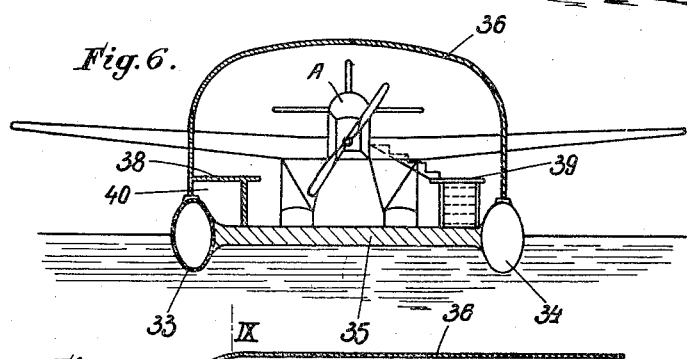
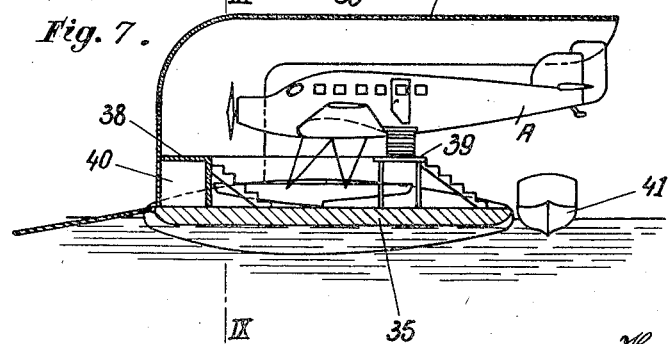

1,751,639

UNITED STATES PATENT OFFICE

HUGO JUNKERS, OF DESSAU, GERMANY

DOCK FOR FLYING MACHINES

Application filed November 16, 1927, Serial No. 233,709, and in Germany July 18, 1927.

My invention refers to flying machines of the kind which are arranged for floating on the water and are termed hydroplanes, seaplanes, flying boats, or the like. These machines shall be referred to in this specification and in the claim appended thereto as hydroplanes, but it is to be understood that this term is not intended to limit the invention to any particular type of flying machine apart from its capacity of floating on the water.

The particular object of the present invention is to provide means whereby hydroplanes can be raised in the water or above the surface of the water, or whereby a hydroplane can be deposited on the surface of the water.

It is an object of my invention to provide means of the kind described which are more efficient and easier to handle than other means hitherto devised for the same purpose.

As is well known, it is desirable, both for the life of a hydroplane and also for a number of other reasons to be explained further below, that the machine be raised above the water surface after each flight. In order to attain this end means have been provided, such as trucks to be rolled underneath the machine in order to allow same to be rolled ashore. Devices of this kind, however, require an even and solid shore capable of serving as a support for the rollers, or a track must be provided extending below the water level. All such devices, more especially if designed for large-sized aircraft, are unhandy and much time and labor is required to haul in the hydroplanes by their aid.

I obtain a quick and easy raising of hydroplanes and a lifting above the water level, by providing auxiliary floats which can be, or are, connected with the hydroplane and onto which the weight of the machine is transferred. In proportion as these floats are gradually rendered capable of supporting the weight of the machine, this latter is lifted free of the water. The same means may serve for gradually depositing the craft on the water.

I can transfer the load of the machine onto the auxiliary floats in several ways, for instance by providing means whereby the vertical distance between the auxiliary floats and the craft, to which they are connected by means of struts, is gradually increased. I may however also load the auxiliary float with ballast to cause same to dip deeply into the water, whereupon the float is either shifted below the hydroplane or this latter above the float, which is then caused to rise by removing the ballast and, in rising, to lift the hydroplane. I may further arrange an auxiliary float in such manner that it facilitates overhauling of the craft and repairing same, further the loading and unloading of heavy useful loads, and the taking on board of the passengers. An auxiliary float according to the present invention may further be fitted with an auxiliary truck or runner, in order to enable the hydroplane to be readily rolled ashore, if it is desired to accommodate the craft in a shed or the like.

In the drawings affixed to this specification and forming part thereof, several forms of a device embodying my invention are illustrated diagrammatically by way of example.

In the drawings

Fig. 1 illustrates a hydroplane carried by two floats having the form of pontoons.

Fig. 2 shows a pair of cylindrical floats interconnected by a platform, with the floats partly filled with ballast, the hydroplane resting on the platform.

Fig. 3 shows the float in position after the hydroplane has been lifted free of the water.

Fig. 4 is a similar view of a dock-shaped float with a truck mounted thereon for the support of the hydroplane.

Fig. 5 is a longitudinal section of the device illustrated in Fig. 4 and showing the manner in which the truck supporting the hydroplane can be hauled ashore.

Fig. 6 is a cross-section on the line IX—IX in Fig. 7, of another form of a pontoon partly covered by a roof offering a shelter for the hydroplane, and Fig. 7 is a longitudinal section corresponding to Fig. 9.

Throughout the figures the reference letter A denotes the hydroplane, which is shown merely by way of example without any limitation as to type and form.

Referring first to Fig. 1, the auxiliary floats 15, 15′ are shown as being formed as independent pontoons of U-section, which can be loaded with water ballast or the like in such manner that their middle portions are immersed in the water and the hydroplane floats can be shifted in position above them. By removing the ballast the auxiliary floats will then rise and will lift the hydroplane.

In the form shown in Figs. 2 and 3 the cylindrical or barrel-shaped floats 16, 16′ are connected with each other by struts forming a platform 17. The floats are loaded with ballast 18 in such manner that the platform 17 can be shifted below the hydroplane floats or the hydroplane can move across the platform to be lifted free of the water after the ballast has been expelled from the auxiliary floats, as shown in Fig. 3.

The pontoon-like float 24 illustrated in Fig. 4 is provided with a track 25 on which a truck 26 is arranged to roll, the platform of the truck being shifted below the hydroplane floats when the pontoon is fully immersed in the water, so that by lifting the pontoon the hydroplane floats are made to rest on the platform and can be lifted above the water surface.

Fig. 5 illustrates the rolling ashore of the truck 26 with the hydroplane A supported thereon, 28 being a landing stage with a track 30 arranged thereon, on which the truck 26 can be hauled into the shed 31 by means of the rod 29. This arrangement offers the advantage that the lifting of the craft onto the truck and the depositing on the water need not be effected near the shore, where the surf frequently renders these operations impossible. The auxiliary float having the form of a broad pontoon offers a steadier support for the craft than its own normal floats, so that the surf will not be able to prevent the craft from being carried ashore. The long hauling tracks extending below the surface of the water can thus be dispensed with altogether.

The auxiliary floats 33, 34 shown in Figs. 6 and 7 are connected by a platform 35 and carry a roof 36 adapted to protect the most important parts of the hydroplane, such as the propeller, engine, cabin, and the like, from storm and rain, only the tops of the wings extending through lateral openings in the side walls. On the main platform are arranged auxiliary stages 38, 39 accessible by suitable stairways, which facilitate inspection and access to the cabin. The spaces underneath the stages can be utilized for storing away all sorts of goods, fuel and oil, accessories, and the like. Pontoon-like floats of this kind may be anchored some distance away from the shore in such manner as to freely adjust themselves in the direction of the wind, so that the hydroplane is enabled to ride across the platform against the wind. The boat 41 carrying the passengers, loads, and the like, can alight directly at the main platform 35, so that the passengers are protected by the projecting portion of the roof.

I wish it to be understood that I do not desire to be limited to the exact details of construction shown and described for obvious modifications will occur to a person skilled in the art.

I claim:—

Means for raising and lowering hydroplanes relative to the water comprising a pontoon-like float the width of which does not considerably exceed the width of the floatation means of a hydroplane, said floats being adapted to be moved into position below the floating hydroplane and to be lifted with the hydroplane supported thereon and a roof on said float which covers the fuselage while leaving the wings of the hydroplane uncovered.

In testimony whereof I affix my signature.
HUGO JUNKERS.